United States Patent [19]

Fernandez

[11] 4,353,068
[45] Oct. 5, 1982

[54] METHOD FOR CALIBRATING BEAM EMITTER TYPE SPEED SENSOR FOR RAILROAD ROLLING STOCK

[76] Inventor: Emilio A. Fernandez, 1019 Salt Meadow La., McLean, Va. 22101

[21] Appl. No.: 152,586

[22] Filed: May 23, 1980

[51] Int. Cl.³ .......................... G01S 7/40; G01P 3/00; B61B 13/00
[52] U.S. Cl. ..................................... 343/17.7; 73/507; 246/182 C
[58] Field of Search ................. 343/17.7; 73/488, 507; 246/182 C

[56] References Cited

U.S. PATENT DOCUMENTS

| | | | |
|---|---|---|---|
| 3,160,463 | 12/1964 | Moscarini | 73/488 X |
| 3,564,488 | 2/1971 | Higashi et al. | 73/488 X |
| 3,787,866 | 1/1974 | Gamertsfelder et al. | 343/17.7 X |

FOREIGN PATENT DOCUMENTS 1237299  6/1971  United Kingdom ............ 246/182 C

OTHER PUBLICATIONS

"Automatic Regulation of Train Speed"; The Railway Gazette, Mar. 5, 1965; pp. 184, 185, 186 and 189.

Primary Examiner—Malcolm F. Hubler
Attorney, Agent, or Firm—Thomas A. Turner, Jr.; Seymour A. Scholnick

[57] ABSTRACT

A beam emitter type speed sensor for railroad rolling stock is calibrated by positioning an endless belt between rails of the track for the railroad rolling stock. The endless belt has a speed which is controllable. The endless belt is so positioned so that the railroad rolling stock can maneuver the speed sensor in proximity thereover having an antenna-to-belt distance comparable to the antenna-to-roadbed distance. A method of calibrating the indicator in the cab includes rotating the belt at a known speed.

7 Claims, 3 Drawing Figures

U.S. Patent   Oct. 5, 1982   Sheet 1 of 2   4,353,068
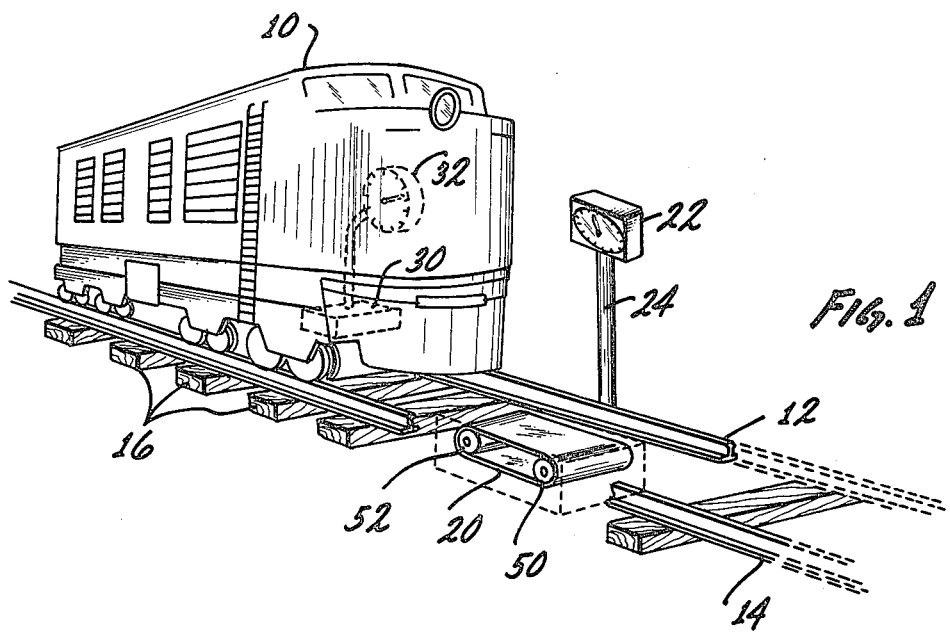
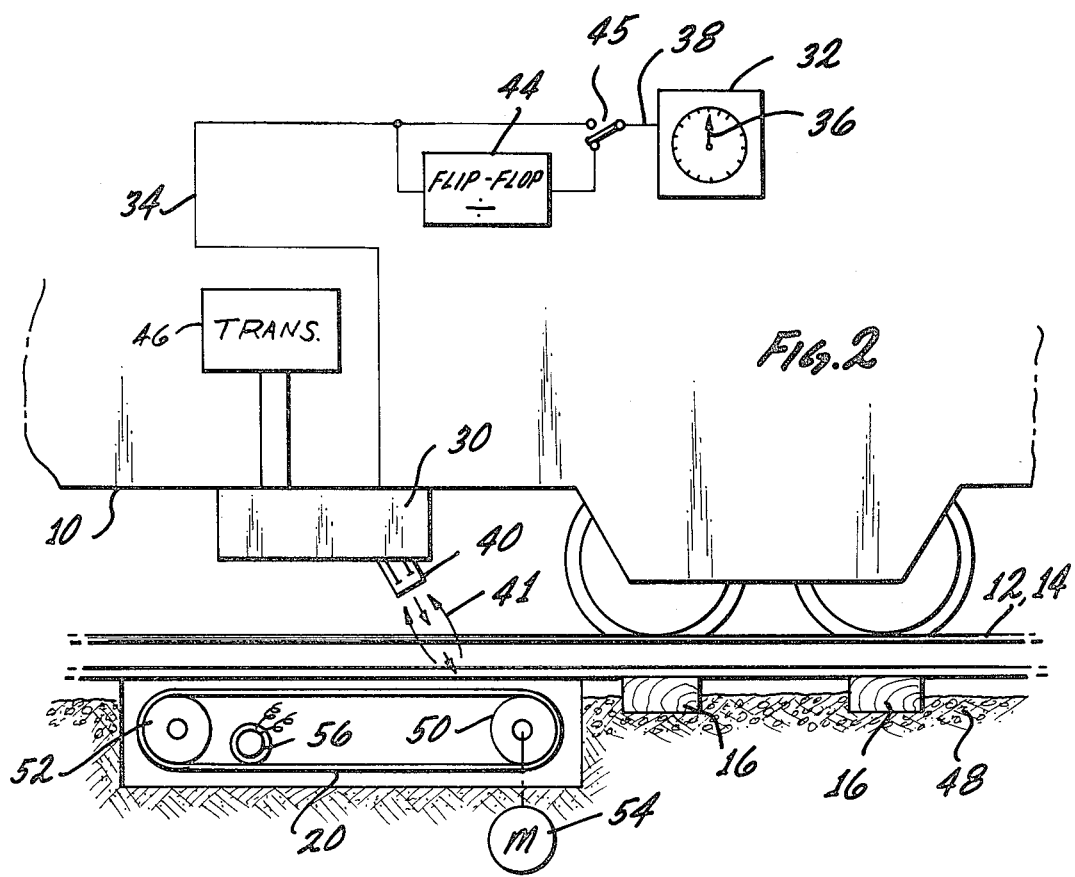

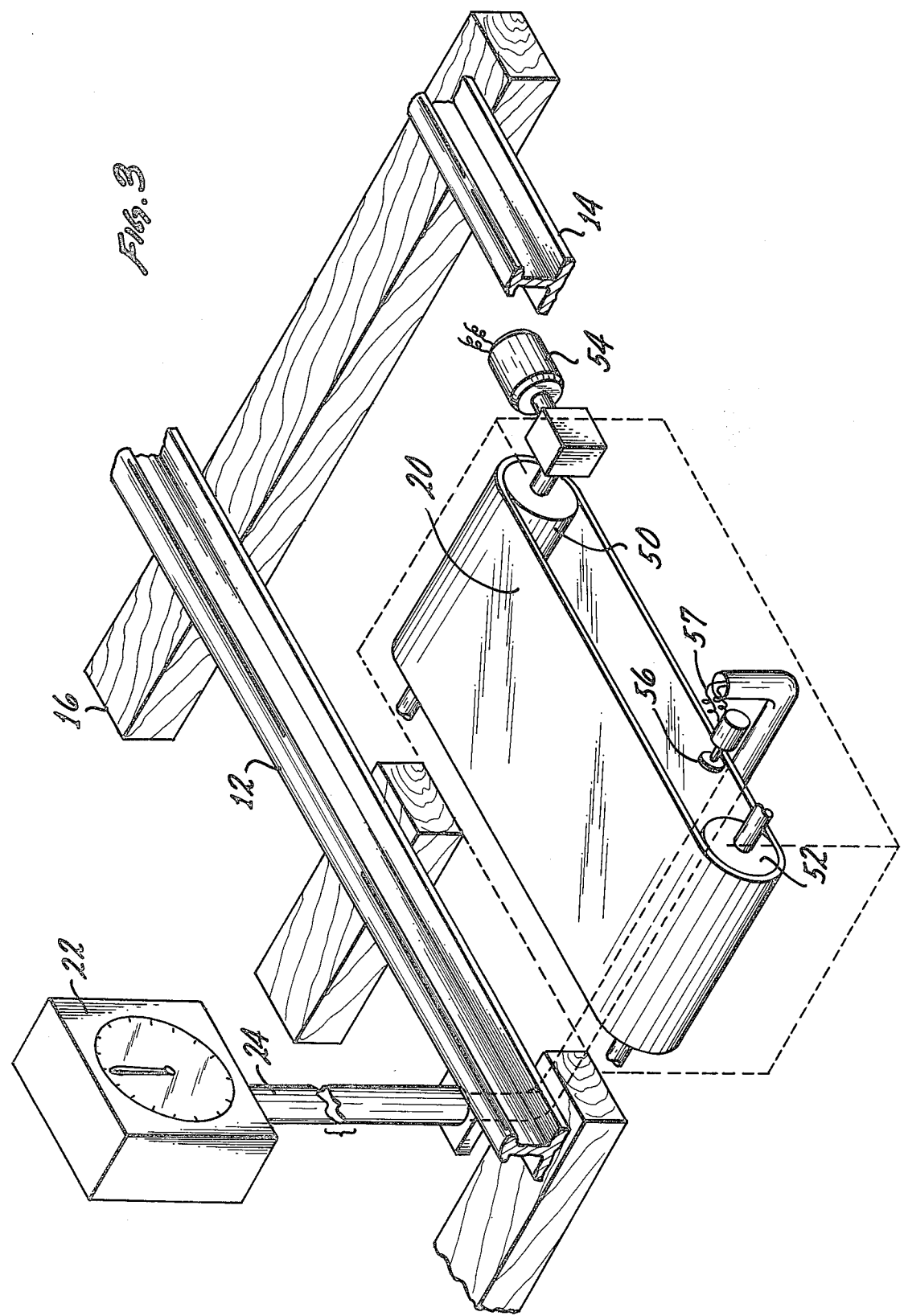

METHOD FOR CALIBRATING BEAM EMITTER TYPE SPEED SENSOR FOR RAILROAD ROLLING STOCK

BACKGROUND OF THE INVENTION

1. Field of the Invention

The present invention relates to the art of calibrating beam emitter type speed sensors, and more particularly relates to a method for calibrating such a speed sensor at line-of-road speeds for railroad rolling stock without the necessity of adjusting the antennae, their housing or their signal processing circuit.

2. Description of the Prior Art

The first overland vehicles to attain remarkable speeds of more than 30 miles per hour over sustained distances were railroad rolling stock in the early and middle Nineteenth Century. Usually, passenger and freight rolling stock powered by steam locomotives were carried over parallel rails mounted on a track bed for long distances. For the convenience of passengers and shippers, the times between stations were often the measure of speed. In the late Nineteenth and early Twentieth Centuries, the great railroad companies in Great Britain staged celebrated races of their trains from London to various points in Scotland often 500 miles away. In America, speed records between various American cities were continually being re-set.

For all that, it was unusual to find a speedometer or speed sensor in a locomotive during those times. Tuplin, in *The Steam Locomotive* (1974), Charles Scribner's Sons, New York, describes that during these times the British drivers were not officially required to carry even a watch, but got along by adjusting their speeds on the basis of their long experience, with some guidance from station clocks and other clocks as they might see from the cab during a trip. The guard of the train was required to carry a watch since he had to record passing times at certain places and to notify the driver at the end of a journey with a signed "ticket" noting time gained or lost according to the pre-announced schedules.

Given the present conditions of certain railbeds along various rail routes in the United States, many carriers do not operate a railroad train at open speed in the present era, and ambitious schedules are frequently abandoned for the sake of safety. Indeed, many states or municipalities have enacted "slow orders" in the form of railroad regulations in order to regulate the speeds of trains over certain sections of track within their jurisdictions. Such regulations are in response not only to roadbed conditions, but also to population density and railroad traffic conditions that might well affect the safety of railroad operations.

In addition to governmental regulations, labor organizations have begun to insist on accurate and operable speed indicators in locomotive cabs. These demands have led one expert in the field to foresee an engineman's right to refuse a consist when the speed indicator is inoperable or inaccurate. See Stringer, Chairman, in the "Report of the Committee on Diesel Electrical Maintenance" before the Chicago Railroad Diesel Club (Sept. 17, 1979).

It is common now for permanent records to be made from the speedometer readings so that the decisions and actions of the locomotive operator can be reconstructed. Such information is invaluable in planning route schedules, routing and in reconstructing problems immediately prior to traumatic disruptions, such as derailments, grade crossing accidents and the like.

In the past, railroad speedometers have taken their reading off of the axle itself. Such a system would be accurate only if there was little slippage of the wheel on the rails; thus significant attention was given to preventing such slippage and loss of adhesion. Certain new locomotive designs, however, will employ new technological concepts that tolerate significant slippage of the wheel on the track. Since the indicator and the speed recording systems are designed to monitor the actual ground speed, such axle derived speedometers will not be sufficient.

Stringer, supra, in his address in late 1979, indicated that radar may successfully eliminate the axle driven speedometer and is something new in the area of electronic speed indicators.

In order to determine the speed in such radar speed sensors as indicated in the prior art, it is necessary to maintain a very precise angle or alignment of the radar beam to the ground underneath, or to provide two ground directed radar beams precisely aligned with respect to each other in order to reference the speed indicating signals in one radar beam against a reference signal of the other radar beam. Thus, the reading of the speed sensing device is dependent upon maintenance of one radar gun or antenna at a precise angle either to the carriage of the locomotive, or to a second reference radar or antenna gun. When the radar gun or antenna beam path and its angle to a reference are changed, the accuracy of the sensed speed deteriorates.

Several Doppler antenna speed indicating devices are known in the prior art for aircraft, as seen representatively in U.S. Pat. No. 2,426,228 to L. Mackta; for ships, as seen representatively in U.S. Pat. No. 3,277,430 to J. Hagemann and D. H. Brunk; and automobiles, as seen representatively in U.S. Pat. No. 4,107,680 to Kaplan and U.S. Pat. No. 3,859,660 to C. F. Augustine and R. E. Anderson. All of these applications are substantially different from those of railroad rolling stock in that railroad rolling stock is subjected to environmental conditions of extreme vibration and shock, substantially more than that in aircraft, ships and automobiles. See Stringer, "Report of the Committee on Diesel-Electrical Maintenance" (Sept. 17, 1979), supra at 155. For examle, a two degree change in this angle of the Doppler antennae, originally set at 45 degrees with respect to the roadbed, results in a 3.5% error in the accuracy of the detected speed. Consequently, it has been found that one cannot simply adapt the Doppler antenna or radar speed sensing devices of the prior art to railroad rolling stock because the antennae are subject to shock and vibration-induced misalignments which intermittently change the readings of the sensors and hence, directly cause inaccuracy in the speed readout from the speed sensing device.

Sometimes the speed and distance traveled of the locomotive is recorded on graphs, and used with other data for important calculations. Over the long distances of train routes, small speed accuracy deterioration can result in significant cumulative distance errors. The severe shock and vibration of the locomotive, moreover, are not the only factors which will change the mounting of the antennae. The air turbulence under the locomotive over the railroad gravel bed stirs gravel and debris, and animals and the like frequently knocking about. Such debris can knock the radar antennae out of mounting alignment.

Periodic calibration of the speed sensor is required, therefore, for reliable speed readouts from such a beam emitter type speed sensor. Alignment requires substantial time and maneuvering of someone under the locomotive. Such alignment necessarily requires manual leveling which very likely cannot be sufficiently rigorous to establish the accuracy desired.

A Doppler antenna calibration apparatus is shown in U.S. Pat. No. 3,787,866 to G. R. Gamertsfelder, Stavis and Vladimir. Such a calibration apparatus requires that the antennae apparatus be detached from its aircraft vehicle and mounted in a special alignment mounting relative to an endless belt, and in very close proximity to the endless belt to provide an accurate reading. After calibration, the speed sensor must be remounted in the vehicle with matching good alignment.

In the case of railroad rolling stock, the antenna would have to be remounted on the railroad vehicle with very good initial alignment accuracy and would have to maintain such alignment throughout long runs of the vehicle. It is desired, therefore, to provide a method which does not depend upon precise alignment but instead provides for readily recalibrating such radar speedometer antennae mounted on the undercarriage of railroad rolling stock. It is also desired to provide a method of recalibrating such radar speedometer antennae without adjusting the antenna mounts or without moving or touching the antennae at all, and to perform such calibration by a railroad electrician acting alone within the locomotive cab.

SUMMARY OF THE INVENTION

In brief, in accordance with one aspect of the invention, in a method of calibrating a heavy duty, Doppler effect radar speed sensor mounted on the undercarriage of a railroad vehicle, the vehicle is rolled over and stopped above an endless belt which is mounted so that the upwardly facing part of the belt loop is substantially flush with the railroad roadbed between the parallel rails of a railroad track.

The endless belt can be run at a known predetermined speed or can be capable of operation at variable selected speeds, which can be indicated on a display elevated on the side of the railroad track to a height approximately that of the windows of the railroad vehicle, such as a locomotive. As antennae mounted on the undercarriage of the locomotive are positioned over the endless belt, railroad personnel in the locomotive can calibrate the speed indicator directly.

Antennae for transmitting and receiving radar type signals are mounted on the undercarriage of the locomotive, and are positioned over the endless belt. The endless belt is run at a predetermined speed, which can be indicated on an observable speed indicator. The reflected signals from the radar antenna structure on the undercarriage of the locomotive are processed through a signal processor to drive a speed indicator mounted in the cab or operating cabin of the locomotive. The railroad personnel or workman calibrating the speedometer can adjust the speed indicator in the locomotive cab to make the speedometer read exactly that of the endless belt.

In an alternative embodiment, the endless belt can be driven by a motor whose speed can be varied in accordance with the desire of the calibrator. Thus, the speed reading of the display element inside the locomotive cab can be perfectly calibrated at any particular selected speed, and variations at speeds different therefrom can be accurately determined by observing the difference in the reading at the varying speed with the indicator indicating the changed speed of the endless belt as the speed of the endless belt is varied.

In another alternative embodiment, the endless belt may be driven at a determined speed which is a calculable fraction or multiple of the speed which is desired to be read in the locomotive cab. The radar antenna and signal processing system can have an alternative circuit for adjusting the speed indicated to a precise multiple of the speed actually detected by the radar speed sensor system.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a perspective view illustrating elements used in the practice of the present invention;

FIG. 2 is a side elevation, partially cutaway view showing the endless belt and speed sensor of the present invention; and FIG. 3 is a perspective view showing elements used in the practice of the present invention, having certain elements cut away for clarity of the interior parts;

DESCRIPTION OF THE PREFERRED EMBODIMENT

In FIG. 1, reference being had to the accompanying drawings, a diesel locomotive 10 is shown rolling on parallel rails 12, 14 which are mounted on ties 16 in the roadbed.

A treadmill or endless belt 20 is constructed between the rails 12, 14 in the roadbed. For an alternative embodiment explained in greater detail below, a speed indicator 22 for indicating the speed of the endless belt is provided on a post 24 and elevated to a height substantially comparable to the windows of the diesel locomotive 10, so that an engineer in the cabin of the diesel locomotive can easily view the speed being indicated.

A radar type speed sensor 30 is mounted on the undercarriage of the locomotive 10, and drives a speed display indicator 32 in the cab of the diesel locomotive, shown in phantom in FIG. 1.

In FIG. 2, the radar speed sensor 30 is shown mounted to the undercarriage of the locomotive 10, having a transmitting and receiving antenna 40 mounted at a precise angle to the ground. Signals 41 are transmitted from the antenna 40, reflected off of the roadbed and received by the antenna 40, but having the frequency slightly shifted by the reflection. The speed sensor 30 compares the frequency of the returned signals 41 with that of the transmitted signals 41, and produces a frequency signal output which is directly related to the frequency shift or differential. In radar speed sensors currently available, the frequency output signal is 22.2 Hz for each mile per hour. This output signal, after conversion into digital signals, is produced in line 34.

The speed indicator 32 has a needle 36 which rotates about the dial responsive to the frequency of the signal received in line 38. In the speed indicators commonly in use, the needle 36 changes one mile per hour for a predetermined frequency increment. A divider network in the form of digital flip-flop divider 44 is connected in series in the line between line 34 and line 38. Divider 44 changes its output signal for every n input signal changes, where n is a discreet integer. Switch 45 allows for an optional bypass of network 44, so that the division by n of the frequency in line 34 can alternatively be eliminated.

The signals transmitted by the antenna 40 are generated by a frequency oscillator and transmitter 46. Radar-Doppler speed sensors considered to be good for the present system employ microwave frequency generators because such frequencies provide good reflection characteristics, even from difficult surfaces, and make possible a highly concentrated beam from a compact antenna.

Details of the Doppler effect radar speed sensor will not be discussed in further detail here, as such systems are well known by those skilled in the art, reference being had, for example, to U.S. Pat. Nos. 2,422,064 and 2,377,430, and other references cited hereinabove. For a simplified and brief summary of the Doppler shift principle in general, reference is directed to Stringer in the "Report of the Committee on Diesel Electrical Maintenance," cited hereinbefore.

As better shown in FIG. 3, the endless belt 20 is mounted on rollers 50, 52 so that one segment of the belt is substantially flush with the level of the roadbed 48. Roller 50 is driven by a motor 54, whose speed can be predetermined and preset in manners well known. The endless belt 20 normally is constructed in a shop pit and therefore recessed so that the top surface of one segment of the belt 20 will be substantially flush with the level of the roadbed 48 or at a level equivalent to the level of the roadbed in the shop pit.

The speed of the belt itself can be measured by a tachometer 56, which can be used to develop a voltage comparable to the speed of the endless belt 20. The voltage signal thus developed can be transmitted by conductors 57 to drive the display 22 (FIGS. 1 and 3). It is not within the scope of the present invention to describe the operation of the speed measuring system including the display element 22, as such systems are well known by those skilled in the art.

In some radar speed sensing systems adapted for railroad use, the sensor unit including the antenna is positioned in line with the wheel over the steel rail, so that the transmitted beam is reflected off the steel rail. To calibrate such a speed sensor using the methods of the present invention, a smaller endless belt can be embedded within a rail segment, having an upward facing segment substantially flush with the top level of the steel rail. The rolling stock positioned in the shop pit can be maneuvered so that the radar-Doppler sensor unit is positioned directly over the upper segment of the endless belt.

Railroad rolling stock, especially locomotives, are extremely large, heavy and fast moving items which create turbulent wind currents in the undercarriage area between the rolling stock and the roadbed. The roadbed normally consists of gravel. It is believed that the wind turbulence just above the roadbed can be such as to cause the gravel to fly when railroad rolling stock is moved thereover at relatively high speeds. It is further believed that various items and elements from the environment and debris falling off of the railroad rolling stock itself can be caught in this turbulence just above the roadbed. It is possible that such debris could knock the radar speed sensor housing 30 so as to change the angle of the antenna gun 40. In order to measure precise and accurate speed, it is important that the angle of the antenna 40 to the roadbed 48 remain precise. It is anticipated in order to keep the radar, Doppler effect speed sensor as accurate as possible, it is necessary to realign the mounting of the antenna 40 at regular intervals. Such attention and maintenance is excessive, yet still does not take care of the long-term drift adjustments sometimes necessary within the electronic circuitry itself. Thus, realigning the sensor 30 with the undercarriage of the locomotive 10 is only part of the necessary operation to calibrate the indicator in the locomotive cab.

By use of the present invention, such alignment of the radar speed sensor 30 is eliminated since the adjustment is made directly at the indicator dial in the locomotive cab. Since it is the indicator 32 that is actually calibrated, it is unnecessary to readjust the radar speed sensor 30 or to adjust the radar-Doppler unit or its signal processing circuitry.

In the operation employing the present invention, the locmotive 10 is rolled over the endless belt 20 so that the speed sensor 30 is positioned directly over the top surface of the endless belt 20. The antenna 40 should be positioned so that the transmitted and received beam 41 will reflect off of the endless belt.

By energizing motor 54, the roller 50 is driven to drive endless belt 20 at a set speed so that the movement of the top surface of the endless belt 20 presents a precise speed to beams 41 emitted from antenna 40. The exact speed of endless belt 20 is known. The speed sensed by the Doppler effect sensor 30 is displayed on indicator 32 in the locomotive cab. Railroad personnel can then adjust the indicator needle 36 with respect to the dial. In this manner, the indicator dial 32 in the locomotive cab will be precisely calibrated at least for the particular known speed at which the endless belt 20 is run.

In the preferred embodiment described hereinabove, it is contemplated that the endless belt 20 will be driven at a set, predetermined speed, so that when the speed sensor 30 is positioned over the belt 20, the railroad personnel calibrating the indicator 32 in the cab will calibrate the indicator directly since he will know the preset speed at which the belt 20 is being run. In an alternative embodiment, the endless belt 20 may be run at any desired speed by varying the current of the motor drive. In such an alternative embodiment, the speed of the belt itself can be measured by a tachometer 56, which can be used to develop a voltage comparable to the speed of the endless belt 20. The voltage signal thus developed can be transmitted by conductors 57 to drive the display 22 (FIGS. 1 and 3). It is not within the scope of the present invention to describe the operation of such a speed measuring system, including the display element 22, as such systems are well-known by those skilled in the art. The display 22 can be mounted at an elevation so that railroad personnel within the locomotive cab can easily ascertain the speed being indicated while they are calibrating the indicator 32 inside the cab.

In such an alternative embodiment, the difference between the speed readings on the indicator 32 at various speeds different from the calibrated speed can be determined by running the endless belt 20 at various known speeds. The reading of the indicator 32 can be visually compared with the indication of indicator display 22 at these speeds different from the calibrated speed. In this manner, the variation of the calibrator 32 from a true reading at various speeds can be tabulated.

In yet another alternative embodiment, the switch 45 can be used to bypass dividing flip-flop 44. The face on the indicator 32 is divided to present a fixed scale having fixed divisions. The speed indicated by the needle 36 on this scale when flip-flop 44 is so bypassed, therefore, will be n times the actual speed of the endless belt 20.

In operation in this alternative embodiment, the endless belt 20 is driven at a substantially lower speed than that indicated on the indicator 32, so that the indicator 32 can be calibrated at a higher speed than that of the endless belt. In many respects, this embodiment may be preferred as it reduces the mechanical problems in running the endless belt at relatively higher speeds. If it is desired to calibrate the indicator 32 at a speed of, for example, 50 miles per hour, the endless belt 20 can be run at a speed of approximately 12.5 miles per hour while the flip-flop divider 44 is bypassed by operation of switch 45. Running the endless belt at 50 miles per hour may prove problematic in that the belt itself may bow between the rollers 50, 52, and the moving parts may wear substantially faster.

By employing the present invention, it can be seen that no mounting alignment of the radar speed sensor 30 or of the antenna 40 need be made. Any realignment made to the sensor mounting is irrelevant since the changing of the display indicator 32 compensates for whatever realignment has occurred. Moreover, any change that has occurred by virtue of age, temperature or the like to the electronic circuitry of the signal processor has also been compensated by the adjustment of the ultimate readout dial indicator 32.

The method of the present invention will work at least as well for radar, Doppler effect speed sensors employing two antennae, one set acting as a reference at a set angle to the second. Such two beam or two antenna systems are usually employed to eliminate the errors due to the vehicle tilt, as representatively shown in U.S. Pat. No. 4,107,680 cited hereinbefore. Such systems are especially useful to reduce substantially or to eliminate errors introduced by a change in the angle of the beam relative to the vehicle. Corrections are not made, however, for errors introduced into the system in the circuitry, signal processing and gain between the antennae and the display indicator on the dashboard. Further, such errors may not be fully compensated merely by an equal rotation of the two antennae fixed relative to each other, since the processing of the reflected signals are calibrated at a particular angle where the beam path is not infinite, nor does it approach infinity. As deviation from the angle of calibration increases, one of the beam paths may begin to approach infinity and the accuracy of the resulting indicated speed becomes less reliable. A point may be reached where even though the two transmitting antennae remain at a fixed angle relative to each other, the angles relative to the vehicle and to the ground, and the beam path length are such that the reliability of the reference beam can no longer be sufficiently satisfactory to establish a reasonably true speed indication for railroad rolling stock purposes.

In the present method of calibration, so long as the speed sensor mounting remains attached to the locomotive 10, the display indicator 32 in the locomotive can be calibrated precisely to a true speed set on the treadmill or belt 20.

In the present invention, a treadmill having any surface which will reflect an emitted radio beam from antenna 40 will satisfy the purpose for an accurate calibration of the speed indicator 32. Thus, relatively smooth surface endless belts may be used with satisfactory results. Alternatively, in order to increase the feedback signals of the beam 41, a multiplicity of scatterers might be placed on the surface of the treadmill 20.

The foregoing detailed description of my invention is illustrative of several embodiments. It is to be understood, however, that additional embodiments may be perceived by those skilled in the art. The embodiments described herein together with those additional embodiments are considered to be within the scope of the present invention.

I claim:

1. A method of calibrating as railroad vehicle speedometer in which speed is measured by a beam emitter type speed sensor mounted on the undercarriage of the railroad vehicle, and is displayed on a readout meter of the speedometer mounted in the vehicle, comprising the steps of:
   a. Positioning an endless belt adapted to be moved in a longitudinal direction substantially parallel to a rail of a railroad track;
   b. Rolling said railroad vehicle on said track over said endless belt to a position at which beams emitted by said speed sensor reflect off said endless belt;
   c. Rotating said endless belt at a predetermined speed relative to said railroad vehicle; and
   d. Calibrating said speedometer to display on its indicator a speed having a predetermined relationship to said predetermined speed.

2. The method of claim 1 wherein said predetermined relationship is identity.

3. The method of claim 1 wherein said predetermined relationship is one to four.

4. The method of either claim 1 or claim 3 wherein said speedometer has an optionally selectable readout value, wherein at least one of said selectable options provides a readout value that is a calculable multiple of the actual speed being determined by said speed sensor.

5. In combination, railroad rolling stock having a speed sensor including means for transmitting and receiving a radio frequency beam of signals reflected off a surface, and means for processing the reflected and received signals to drive a speed indicator mounted within the railroad rolling stock vehicle;
   parallel rails on which said railroad rolling stock vehicle is mounted and rolled;
   endless belt means for moving an endless belt with one exposed face substantially flush with the level of said surface reflecting said beam of signals, said endless belt means comprising means for driving said face at at least one predetermined speed, said endless belt means being mounted in juxtaposition to said parallel rails such that when said railroad rolling stock is rolled thereover, said exposed face will reflect substantially said radio frequency beam of signals; and
   means positioned within said railroad rolling stock and operable by an operator thereof, for calibrating said speed indicator in response to said signals received from said endless belt.

6. The railroad rolling stock combination of claim 5, wherein said endless belt means is mounted between said railroad rails.

7. The railroad rolling stock combination of claim 5, further including speed indicator means connected to said endless belt means and including a display dial positioned alongside said track and elevated to a height from which an operator inside the railroad rolling stock vehicle may observe, for indicating on said dial the speed of said at least one exposed surface.

* * * * *